United States Patent
Takayama

(10) Patent No.: US 7,956,903 B2
(45) Date of Patent: Jun. 7, 2011

(54) IMAGING APPARATUS

(75) Inventor: Jun Takayama, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 404 days.

(21) Appl. No.: 12/304,175

(22) PCT Filed: Jun. 5, 2007

(86) PCT No.: PCT/JP2007/061362
§ 371 (c)(1),
(2), (4) Date: Dec. 10, 2008

(87) PCT Pub. No.: WO2007/145099
PCT Pub. Date: Dec. 21, 2007

(65) Prior Publication Data
US 2009/0251571 A1   Oct. 8, 2009

(30) Foreign Application Priority Data
Jun. 14, 2006   (JP) .................. 2006-164651

(51) Int. Cl.
H04N 5/228 (2006.01)
H04N 5/235 (2006.01)
G06K 9/40 (2006.01)
H01L 27/00 (2006.01)

(52) U.S. Cl. ........... 348/222.1; 348/221.1; 348/229.1; 348/362; 348/241; 382/274; 250/208.1

(58) Field of Classification Search ........... 348/221.1, 348/229.1, 230.1, 294, 296, 297, 222.1, 362–366; 382/254, 274, 276
See application file for complete search history.

(56) References Cited

U.S. PATENT DOCUMENTS
6,191,408 B1 * 2/2001 Shinotsuka et al. ....... 250/208.1
7,880,778 B2 * 2/2011 Kamon .................. 348/241
2006/0215908 A1 * 9/2006 Kamon et al. ............. 382/167

FOREIGN PATENT DOCUMENTS
JP   2005348005   12/2005
JP   2006020278   1/2006
JP   2006050541   2/2006
JP   2006109327   4/2006

* cited by examiner

*Primary Examiner* — Lin Ye
*Assistant Examiner* — Marly Camargo
(74) *Attorney, Agent, or Firm* — Lucas & Mercanti, LLP

(57) ABSTRACT

An imaging device (1) including; a fluctuation correcting section (13) for correcting fluctuation of the input/output characteristics of the imaging element (4), and the linearizing section (14) for converting the signals outputted from the imaging element (4) into the state where the output signals are uniformly converted by one conversion characteristic. The fluctuation correcting section (13) is provided with a first correcting section (13a) for correcting fluctuation based on a computing equation obtained by modeling a plurality of kinds of conversion characteristic, and a second correcting section (13b) for correcting the output signals in a region close to a switch point of a plurality of kinds of conversion characteristics among the output signals whose fluctuations are corrected by the first correcting section (13a), by using model equations of two characteristics on the sides of the switch point, so that the output signal overlaps the characteristic of the imaging element (4).

18 Claims, 12 Drawing Sheets

THE d2, h2, k2, m2 AND n2 DENOTE THE VARIABLES THAT VARY ACCORDING TO THE EXPOSURE TIME $t_2$

THE d2, h2, k2, m2 AND n2 DENOTE THE VARIABLES THAT VARY ACCORDING TO THE CONTROL VOLTAGE $V_2$ $\beta_a$ : INDICATES A COEFFICIENT THAT CHANGES AS FOLLOWS (AN EXAMPLE)

$\gamma_a$ : INDICATES A COEFFICIENT THAT CHANGES AS FOLLOWS (AN EXAMPLE)

IMAGING APPARATUS

This is a U.S. National Phase Application under 35 U.S.C. 371 of International Application PCT/JP2007/061362 filed on Jun. 5, 2007, which claims the priority of Japanese Application No. 2006-164651, filed Jun. 14, 2006, the entire content of both Applications are hereby incorporated by reference.

FIELD OF THE INVENTION

The present invention relates to an imaging apparatus provided with an imaging element for converting incident light into en electric signal.

BACKGROUND OF THE INVENTION

A conventional imaging apparatus such as a digital camera has been provided with an imaging element containing a plurality of pixels for converting incident light into an electric signal. One of the products proposed in recent years is an imaging element having a plurality of types of photoelectric conversion characteristics.

One of the imaging elements having a plurality of types of photoelectric conversion characteristics is a linear/log transformation sensor that provides switching between the linear transformation for linearly transforming the incident light into electric signal based on the amount of incident light, and the logarithmic transformation for performing logarithmic transformation (Patent Document 1). According to this technique, the brightness range of the electric signal is wider than that of the imaging element that performs only the linear transformation. Thus, even when imaging an object having a wider brightness range, the brightness information can be represented by the electric signal.

The imaging element having a plurality of types of photoelectric conversion characteristics provides the output signal changed by a plurality of characteristics, and involves complicated computation in signal processing. To solve this problem, signal processing is made easy by characteristic conversion (or simply called "unification") that uniformly converts the entire output signal using any one of a plurality of types of photoelectric conversion characteristics.

Incidentally, the aforementioned imaging element may have a variation in the input/output characteristics due to the difference in pixels. Thus, to remove such a variation, a method has been proposed to correct the output from each pixel and to find agreement with the reference output value (Patent Document 2)

Patent Document 1: Japanese Unexamined Patent Application Publication No. 11-298799
Patent Document 2: Japanese Unexamined Patent Application Publication No. 5-30350

DISCLOSURE OF INVENTION

Problems to be Solved by the Invention

In the method of correction described in the Patent Documents 1 and 2, however, when there is a fluctuation in the input/output characteristics caused by such driving conditions as imaging conditions and environmental conditions, disagreement between the reference output value under the reference conditions and the output value of the actual pixel cannot be corrected. Thus, the entire electric signal cannot be accurately subjected to linearly transformation or logarithmic transformation, according to these conventional techniques.

Further, in the aforementioned correction, if the output signal model formed by formulating mathematical expression of the output signal (linear transformation signal or logarithmic transformation) of various characteristics is used as the reference output value, the output signal of the actual imaging element exhibits a smoothly curved change in the area where signals of different characteristics are present. As a result, a correction error occurs between the actual output signal and output signal model in this area, and the output signal of the imaging element cannot be corrected, according to these conventional techniques.

The object of the present invention is to provide an imaging apparatus that ensures accurate characteristic conversion wherein the output signal of the imaging element is uniformly converted by one characteristic.

Means for Solving the Problems

The invention of the first aspect is an imaging apparatus including:

an imaging element having a plurality of pixels for converting incident light into electric signal using a plurality of types of conversion characteristics; and a signal processing section for processing a output signal of the imaging element, the signal processing section including:

a fluctuation correction section that, when input/output characteristics of the imaging element are subjected to fluctuation caused by at least one of driving condition of the imaging element, corrects the fluctuation of the output signal of the imaging element; and a characteristic conversion section for uniformly converting the output signal of the imaging element using one conversion characteristic, wherein the fluctuation correction section including:

a first correction section for correcting the fluctuation according to a computation formula obtained by modeling the plurality of types of conversion characteristics, and a second correction section correcting the output signals located near the switch points of a plurality of types of the conversion characteristics among the output signals whose fluctuation has been corrected by the first correction section, wherein the second correction section corrects the output signals so as to overlap the characteristics of the imaging elements, by using a model formulas of two characteristics on both sides of a switch point.

In this case, the driving conditions of the imaging element consist of external conditions and imaging conditions. The external conditions include temperature, whereas the imaging conditions include pixel exposure time and control voltage.

According to the invention of aspect 1, when the input/output characteristics of the imaging element are subjected to fluctuation under the driving condition of at least one of the imaging elements, the fluctuation of the electric signal outputted from this imaging element is corrected. Thus, even if the input/output characteristics are subjected to fluctuation under the driving conditions, disagreement between the output value of the reference driving condition and the actual output value of the imaging element is corrected, unlike the conventional cases. Thus, accurate linear transformation or logarithmic transformation of the electric signal is uniformly provided by the characteristic conversion.

In the first correction section, fluctuation can be corrected simply and quickly based on the modeled computation formula, and when fluctuation is corrected based on the computation formula obtained by modeling the output signal of each characteristic, the output signal of the actual imaging element undergoes fluctuation of a smooth curve near the switch point. Therefore, a correction error with respect to the output signal model occurs. However, but in the second correction section, the output signal near the switch point is corrected using the model formulas of two characteristics on both sides of the switch point, whereby the conversion error can be suppressed, and the image quality can be improved.

The invention of aspect 2 is the imaging apparatus described in aspect 1, further characterized in that the first correction section includes:

a coefficient derivation section for deriving a correction coefficient; and a computation processing section for correcting the fluctuation based on the correction coefficient.

The derivation of the correction coefficient in the sense in which it is used here can be calculation of correction coefficient, or selection from among a plurality of correction coefficients.

According to the invention of aspect 2, the same advantages as those of the aforementioned invention can be obtained.

The invention of aspect 3 is the imaging apparatus described in aspect 2, further characterized in that the coefficient derivation section derives the correction coefficient based on the driving conditions.

According to the invention of aspect 3, the coefficient derivation section derives the correction coefficient based on the driving conditions. Accordingly, the derived correction coefficient is used by the computation processing section, thereby accurately correcting the fluctuation of the input/output characteristics of the imaging element caused by the driving conditions.

The invention of aspect 4 is the imaging apparatus described in aspects 2 or 3, further characterized in that the coefficient derivation section derives the correction coefficient for each pixel based on the driving conditions and pixel information on the pixel, and the computation processing section corrects the fluctuation for each pixel.

The inherent information such as a pixel ID number or the position information in the imaging element is used as the pixel information.

According to the invention of aspect 4, the coefficient derivation section derives the correction coefficient based on the driving conditions and pixel information. Thus, the derived correction coefficient is used by the computation processing section, thereby accurately correcting the fluctuation of the input/output characteristics of the imaging element caused by the driving conditions or pixel.

The invention of aspect 5 is the imaging apparatus described in any one of the aspects 2 through 4, further characterized in that the coefficient derivation section includes a lookup table for deriving the correction coefficient by the input of at least the driving conditions.

According to the invention of aspect 5, the correction coefficient is derived from the lookup table. Thus, the structure of the coefficient derivation section is simplified and derivation processing speed is increased, as compared to the case of deriving the correction coefficient by computation.

The invention of aspect 6 is the imaging apparatus described in any one of the aspects 2 through 4, further characterized in that the coefficient derivation section includes a computing unit for deriving the correction coefficient by the input of at least the driving conditions.

According to the invention of aspect 6, the same advantages as those of the aforementioned inventions can be obtained.

The invention of aspect 7 is the imaging apparatus described in aspect 1, further characterized in that the first correction section includes the lookup table for deriving the fluctuation-corrected electric signal by the input of the driving conditions and the output signal of the imaging element.

According to the invention of aspect 7, the fluctuation correction section derives the electric signal subsequent to the step of fluctuation correction based on the driving conditions, whereby the fluctuation in the input/output characteristics of the imaging element caused by the driving conditions is accurately corrected. Further, the lookup table is used to derive the fluctuation-corrected electric signal. This arrangement simplifies the structure of the fluctuation correction section and increases the derivation speed, as compared to the case of deriving the fluctuation-corrected electric signal by computation.

The invention of aspect 8 is the imaging apparatus described in aspect 7, further characterized in that the lookup table derives the fluctuation-corrected electric signal through the input of the driving conditions, pixel information on the pixel, and the output signal of the imaging element.

According to the invention of aspect 8, the fluctuation-corrected electric signal is derived based on the driving conditions and pixel information. This arrangement accurately corrects the fluctuation of the input/output characteristics caused by the driving conditions and pixel.

The invention of aspect 9 is the imaging apparatus described in aspect 1, further characterized in that the second correction section corrects the output signal near the switch point in response to the switch point of a plurality of types of conversion characteristics for each of the driving conditions.

According to the invention of aspect 9, the switch point of a plurality of types of conversion characteristics fluctuates in response to the driving conditions of the imaging element. A more effective suppression of the conversion error can be achieved by correcting the output signal near the switch points in response to the switch point.

The invention of aspect 10 is the imaging apparatus described in the aspect 1 or 9, further characterized in that the second correction section including a lookup table for deriving the corrected output signal using the model formulas of two characteristics on both sides of the switch point so as to overlap the characteristics of the imaging element by the input of the output signal near the switch point.

According to the invention of aspect 10, the output signal subsequent to correction is derived according to the lookup table. This arrangement simplifies the structure of the second correction section and increases the derivation speed as compared to the case wherein correction is performed by computation.

The invention of aspect 11 is the imaging apparatus described in any one of the aspects 1 through 10, further including a plurality of the fluctuation correction sections associated with pixels.

According to the invention of aspect 11, fluctuation correction sections are provided in the form associated with pixels. This arrangement ensures accurate fluctuation correction even if the amount of fluctuation in the input/output characteristics is different for each pixel.

The invention of aspect 12 is the imaging apparatus described in any one of the aspect 1 through 11, further including a plurality of the fluctuation conversion sections associated with pixels.

According to the invention of aspect 12, characteristic conversion sections are provided in the form associated pixels. This arrangement ensures accurate and uniform linear transformation or logarithmic transformation of all the electric signals even if the photoelectric conversion characteristics are different for each pixel.

The invention of aspect 13 is the imaging apparatus described in any one of the aspects 1 through 12, further including a derivation section for deriving the switch point signal value at the switch point for the plurality of types of conversion characteristics wherein the signal processing section provides signal processing according to the relation of magnitude between the output signal value from the imaging element and the signal value of the switch point signal, only when the output signal from the imaging element is the electric signal converted by any one of a plurality of types of conversion characteristics.

According to the invention of aspect 13, signal processing is performed only when the output signal from the imaging element is the electric signal converted by any one of a plurality of types of conversion characteristics. Thus, signal processing such as characteristic conversion or fluctuation correction is not performed if there is no need of conversion by other conversion characteristics. This arrangement saves the trouble for signal processing, and increases the processing speed.

The invention of aspect 14 imaging apparatus described in the aspect 13, further characterized in that the derivation section further derives the switch point signal value, based on the driving conditions.

According to the invention of aspect 14, the switch point signal value is derived based on the driving conditions. This ensures accurate derivation of the switch point signal value.

The invention of aspect 15 is the imaging apparatus described in the aspect 13 or 14, further characterized in that the derivation section further derives the switch point signal value, based on the driving conditions and the information on pixel.

According to the invention of aspect 15, the switch point signal value is derived based on the driving conditions and the aforementioned information on pixel. This arrangement ensures accurate derivation of the switch point signal value.

The invention of aspect 16 is the imaging apparatus described in the aspect 14 or 15, further characterized in that the derivation section further including a lookup table for deriving the switch point signal value.

According to the invention of aspect 16, a lookup table is used to derive the switch point signal value. This procedure simplifies the structure of the derivation section, as compared to the case of derivation by computation The invention of aspect 17 is the imaging apparatus described in the aspects 14 or 15, further including a computing unit for deriving the switch point signal value.

According to the invention of aspect 17, the same advantages as those of the aforementioned inventions can be provided.

The invention of aspect 18 is the imaging apparatus described in any one of the aspects 1 through 17, further characterized in that the driving condition further is at least one of a temperature at the time of imaging, an exposure time of the pixel and a control voltage for the pixel.

According to the invention of aspect 18, the same advantages as those of the aforementioned inventions can be provided.

The invention of aspect 19 is the imaging apparatus described in any one of the aspects 1 through 18, further characterized in that a plurality of pixels are formed in such a way that the linear transformation characteristic for linearly transforming the electric signal and the logarithmic transformation characteristic for logarithmically transforming the incident light can be switched in response to the amount of incident light.

According to the invention of aspect 19, the same advantages as those of the aforementioned inventions can be provided in an imaging apparatus including a linear/log transformation type sensor as an imaging element.

Effects of the Invention

According to the invention described in aspect 1, even if the input/output characteristics are subjected to fluctuation under the driving conditions, accurate linear transformation or logarithmic transformation of the electric signal can be uniformly provided by the characteristic conversion.

Further, easy and quick correction of fluctuation can be achieved, and the output signal near the switch point is corrected in conformity to the actual characteristics of the imaging element, using the model formulas of two characteristics on both sides of the switch point, whereby the conversion error can be suppressed, and the image quality can be improved.

The invention of aspect 2 provides the same advantages as those of the invention.

The invention of aspect 3 ensures accurate correction of the fluctuation in the input/output characteristics of the imaging element caused by the driving conditions.

The invention of aspect 4 ensures accurate correction of the fluctuation in the input/output characteristics of the imaging element caused by the driving conditions and pixel.

The invention of aspect 5 uses a lookup table to simplify the structure of the coefficient derivation section and to increase the derivation speed.

The invention of aspect 6 provides the same advantages as those of the aforementioned invention.

The invention of aspect 7 provides accurate correction of the fluctuation in the input/output characteristics of the imaging element caused by the driving conditions Further, a lookup table is used to simplify the structure of the fluctuation correction section and to increase the derivation speed.

The invention of aspect 8 ensures accurate correction of the fluctuation in the input/output characteristics of the imaging element caused by the driving conditions and pixel.

The invention of aspect 9 carries out correction in response to the switch point for each driving condition, whereby more effective suppression of a conversion error can be achieved.

The invention of aspect 10 uses a lookup table to simplify the structure of the second correction section and to increase the derivation speed.

The invention of aspect 11 ensures accurate fluctuation correction even if there are differences in the amount of fluctuation in input/output characteristics for each pixel.

The invention of aspect 12 ensures accurate linear transformation or logarithmic transformation of all the electric signals uniformly even if there are differences in the photoelectric conversion characteristics for each pixel.

The invention of aspect 13 saves the trouble for signal processing, and increases the processing speed.

The invention of aspect 14 ensures accurate derivation of the switch point signal value.

The invention of aspect 15 ensures accurate derivation of the switch point signal value.

The invention of aspect 16 uses a lookup table to simplify the structure of the derivation section and to increase the derivation speed.

The invention of aspect 17 provides the same advantages as those of the aforementioned invention.

The invention of aspect 18 provides the same advantages as those of the aforementioned invention.

The invention of aspect 19 provides the same advantages as those of the aforementioned inventions in an imaging apparatus including a linear/log transformation type sensor as an imaging element.

DESCRIPTION OF REFERENCE NUMERALS

Figure 1:
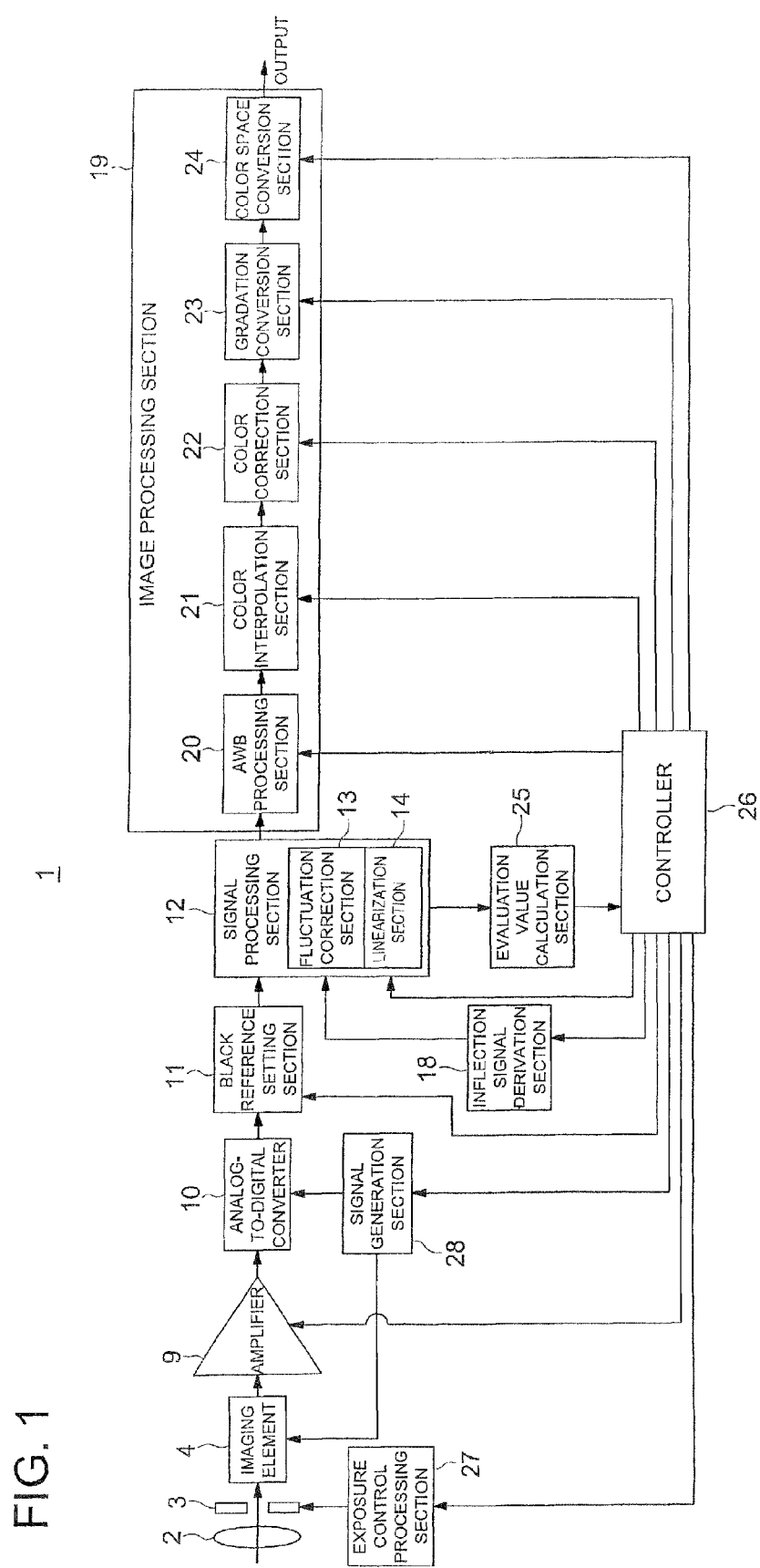
FIG. 1 is a block diagram representing the schematic structure of an imaging apparatus of the present invention.

1. Imaging apparatus
2. Lens group
3. Stop
4. Imaging element
9. Amplifier
10. Analog-to-digital converter
11. Black reference setting section
12. Signal processing section
13. Fluctuation correction section
14. Linearizing section
15. Coefficient derivation section
15a. Lookup table
16. Computation processing section
17. Lookup table
18. Inflection signal derivation section
18a. Lookup table
19. Image processing section
20. AWB processing section
21. Color interpolation section
22. Color correction section
23. Gradation conversion section
24. Color space conversion section
25. Evaluation value calculation section
26. Controller
27. Exposure control processing section
28. Signal generation section

BEST MODE FOR CARRYING OUT INVENTION

Embodiment

Referring to drawings, the following describes the embodiments of the present invention:

FIG. 1 is a block diagram representing the schematic structure of an imaging apparatus 1 of the present invention.

As shown in FIG. 1, the imaging apparatus 1 includes an imaging element 4 for receiving incident light through a lens group 2 and stop 3. The conventionally known lens group and stop can be used as the lens group 2 and stop 3.

In this case, the imaging element of the present invention is an imaging element including a plurality of pixels that converts the incident light into electric signal using a plurality of types of conversion characteristics in such a way that the output signals having a plurality of types of conversion characteristics are changed on a continuous basis through the switch point.

The imaging element 4 of the embodiments is designed as a linear/log transformation sensor that switches between a linear transformation operation for linearly transforming incident light into electric signal and a logarithmic transformation operation for logarithmically transforming incident light into electric signal based on the amount of incident light. To be more specific, the output signal of the imaging element 4 is changed from the linear area to the logarithmic area on a continuous basis through an inflection point. The inflection point in the sense in which it is used here refers to a boundary between the linear transformation operation and logarithmic transformation operation. It is a term that constitutes a narrower concept of the "switch point" of the output signal of the imaging element having a plurality of types of conversion characteristics.

Figure 2:
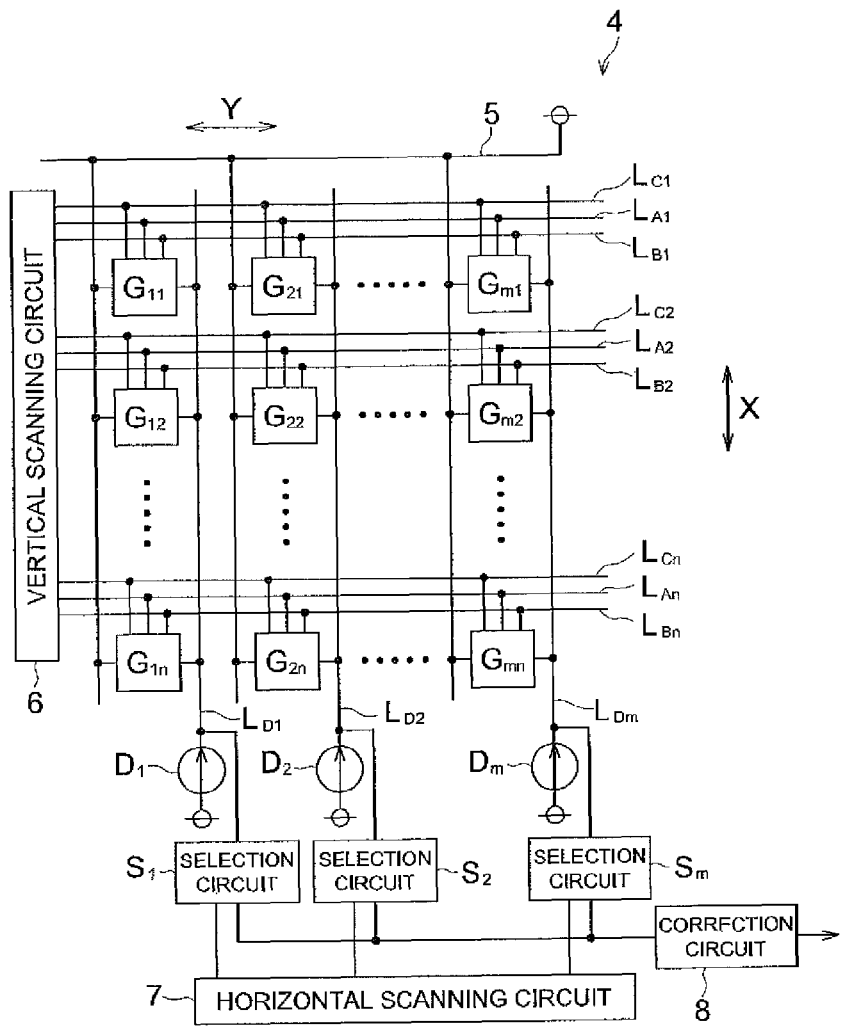
FIG. 2 is a block diagram showing the structure of an imaging element.

As shown in FIG. 2, the imaging element 4 includes a plurality of pixels $G_{11}$ through $G_{mn}$ (where n and m indicate the integers of 1 and more) which are arranged in matrix.

A filter (not illustrated) of any one color of the Red, Green and Blue is arranged on the side of the lens group 2 of each of the pixels $G_{11}$ through $G_{mn}$. The pixels $G_{11}$ through $G_{mn}$ can be provided with other colors such as cyan (C), magenta (M) and yellow (Y).

As shown in FIG. 2, the pixels $G_{11}$ through $G_{mn}$ are connected with a power source 5, signal application lines $L_{A1}$ through $L_{An}$, $L_{B1}$ through $L_{Bn}$ and $L_{C1}$ through $L_{Cn}$, and signal readout lines $L_{D1}$ through $L_{Dn}$. The pixels $G_{11}$ through $G_{mn}$ are also connected with a clock line or bias supply line, which are omitted in FIG. 2.

The signal application lines $L_{A1}$ through $L_{An}$, $L_{B1}$ through $L_{Bn}$ and $L_{C1}$ through $L_{Cn}$ apply signals $\phi_V$ and $\phi_{VPS}$ (FIG. 3) to the pixels $G_{11}$ through $G_{mn}$. The signal application lines $L_{A1}$ through $L_{An}$, $L_{B1}$ through $L_{Bn}$ and $L_{C1}$ through $L_{Cn}$ are connected with vertical scanning circuit 6. The vertical scanning circuit 6 applies signals to the signal application lines $L_{A1}$ through $L_{An}$, $L_{B1}$ through $L_{Bn}$ and $L_{C1}$ through $L_{Cn}$ based on the signal from the signal generation section 28 (FIG. 1), and sequentially switches the signal application lines $L_{A1}$ through $L_{An}$, $L_{B1}$ through $L_{Bn}$ and $L_{C1}$ through $L_{Cn}$ in the direction X.

The electric signal generated by pixels $G_{11}$ through $G_{mn}$ is derived into the signal readout lines $L_{D1}$ through $L_{Dm}$. The signal readout lines $L_{D1}$ through $L_{Dm}$ are connected with the constant current sources $D_1$ through $D_m$ and selection circuits $S_1$ through $S_m$.

Direct-current voltage $V_{PS}$ is applied to one end (lower end in the drawing) of each of the constant current sources $D_1$ through $D_m$.

The selection circuits $S_1$ through $S_m$ sample-hold the noise signal obtained from the pixels $G_{11}$ through $G_{mn}$ and the electric signal at the time of imaging through the signal readout lines $L_{D1}$ through $L_{Dm}$. The selection circuits $S_1$ through $S_m$ are connected with a horizontal scanning circuit 7 and a correction circuit 8. The horizontal scanning circuit 7 sequentially switches in the direction Y the selection circuit $S_1$ through $S_m$ that sample-hold the electric signal and send the same to the correction circuit 8. The correction circuit 8 removes the noise signal from the electric signal in conformity to the noise signal sent from the selection circuit $S_1$ through $S_m$ and the electric signal at the time of imaging.

The circuits disclosed in the Japanese Unexamined Patent Application Publication No. 2001-223948 can be used as the selection circuit $S_1$ through $S_m$ and correction circuit 8. The present embodiment has been described on the assumption that only one correction circuit 8 is arranged for all the selection circuit $S_1$ through $S_m$. However, one correction circuit 8 can arranged for each of the selection circuit $S_1$ through $S_m$.

The following describes the pixels $G_{11}$ through $G_{mn}$.

Figure 3:
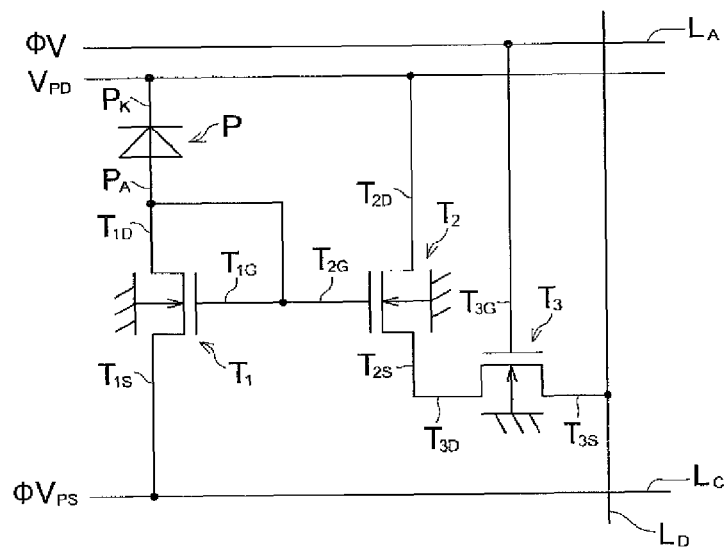
FIG. 3 is a circuit diagram showing the structure of a pixel.

As shown in FIG. 3, the pixels $G_{11}$ through $G_{mn}$ are provided with photodiodes P and transistors $T_1$ through $T_3$. The transistors $T_1$ through $T_3$ are the N-channel MOS transistors with the back gate connected to the ground.

The photodiode P is exposed to the light having passed through the lens group 2 and stop 3. Direct-current voltage $V_{PD}$ is applied to the cathode $P_K$ of this photodiode P, and the anode $P_A$ is connected with the drain $T_{1D}$ and gate $T_{1G}$ of the transistor $T_1$, and gate $T_{2G}$ of the transistor $T_2$.

The source $T_{1S}$ of the transistor $T_1$ is connected with the signal application line $L_C$ (equivalent to $L_{C1}$ through $L_{Cn}$ of FIG. 2) so that the signal $\phi_{VPS}$ will be inputted through the signal application line $L_C$. Here the signal $\phi_{VPS}$ is a binary voltage signal. To put it in greater details, this signal assumes either of the two values—the voltage value VH for operating the transistor $T_1$ in the sub-threshold area and the voltage value VL for activating the transistor $T_1$—when the amount of incident light has exceeded a predetermined level.

Further, direct-current voltage $V_{PD}$ is applied to the drain $T_{2D}$ of the transistor $T_2$. The source $T_{2S}$ of the transistor $T_2$ is connected with the drain $T_{3D}$ of the transistor $T_3$ for selecting a row.

The gate $T_{3G}$ of this transistor $T_3$ is connected with the signal application line $L_A$ (equivalent to $L_{A1}$ through $L_{An}$ of FIG. 2) so that the signal $\phi_V$ can be inputted through the signal application line $L_A$. The source $T_{3s}$ of the transistor $T_3$ is connected with the signal readout line $L_D$ (equivalent to $L_{D1}$ through $L_{Dm}$ of FIG. 2).

The pixels disclosed in the Japanese Unexamined Patent Application Publication No. 2002-77733 can be used as the pixels $G_{11}$ through $G_{mn}$ aforementioned.

According to the aforementioned structure, the pixels $G_{11}$ through $G_{mn}$ allows the incident light to be subjected to photoelectric conversion, whereby electric signal is outputted. The pixels $G_{11}$ through $G_{mn}$ of the present embodiment performs switching of conversion to the electric signal based on the amount of incident light. As shown by the solid line in FIG. 4, the linear transformation operation of linearly transforming the incident light is applied when the amount th of this incident light is below a predetermined level, whereas logarithmic transformation operation of logarithmically transforming the incident light is applied when the amount th of this incident light is equal to or greater than a predetermined level.

The so-called inflection point—i.e., the boundary wherein there is switching between the linear transformation operation and logarithmic transformation operation—varies according to the driving conditions of pixels $G_{11}$ through $G_{mn}$ in the imaging element 4 such as exposure time and control voltage at the time of imaging.

To be more specific, the potential difference between the gate $T_{2G}$ of the transistor $T_2$ and the source $T_{2S}$ increases with the reduction in exposure time, and there is an increase in the percentage of the subject brightness wherein the transistor $T_2$ operates in the cut-off state, i.e., in the percentage of the subject brightness wherein linear transformation is performed. This arrangement ensures that the percentage of the linear transformation operation increases with the reduction in exposure time. Further, when there is an increase in the control voltage for the imaging element 4, i.e., the difference between the voltage value VL and voltage value VH of the signal $\phi_{VPS}$, or the temperature is reduced, there is also an increase in the percentage of the subject brightness wherein linear transformation is performed. Thus, the dynamic range of the image signal, the aforementioned predetermined amount th of incident light at the switch point or inflection point, and the output signal value at the switch point (switch point signal value), i.e., the output signal value at the inflection point (hereinafter referred to as "inflection output signal value H") can be controlled by changing the control voltage, exposure time and temperature.

Concretely, if the brightness range of the subject is insufficient, the voltage value VL is reduced and the brightness range for linear transformation is increased. If the brightness range of the subject is excessive, the voltage value VL is raised and the brightness range for logarithmic transformation is increased. This arrangement conforms the photoelectric conversion characteristics of the pixels $G_{11}$ through $G_{mn}$ to the characteristics of the subject. Further, the mode can be selected so that the pixels $G_{11}$ through $G_{mn}$ are subjected to linear transformation at all times when the voltage value VL is minimized, whereas the pixels $G_{11}$ through $G_{mn}$ are subjected to logarithmic transformation at all times when the voltage value VL is maximized.

Figure 5:
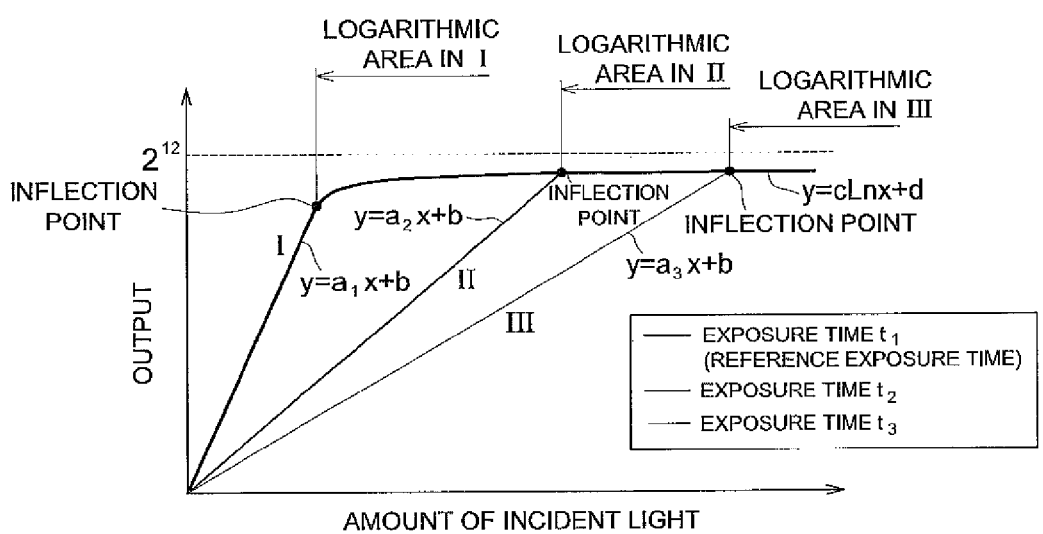
FIG. 5 is a diagram showing the relationship between exposure time and inflection point.
Figure 6:
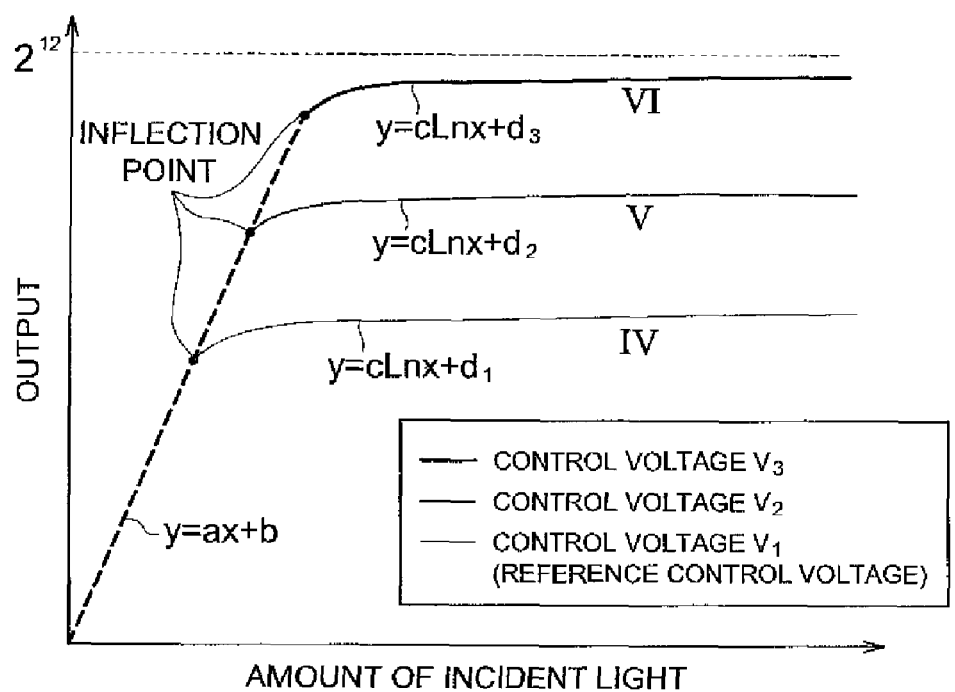
FIG. 6 is a diagram representing the relationship between the control voltage and inflection point.

For example, as shown in FIG. 5, as the exposure time is reduced in the order of $[t_1]$ through $[t_3]$, the inflection output signal value H at the inflection point and the predetermined amount th of incident light are increased in the order of [I] through [III]. As shown in FIG. 6, as the control voltage is reduced in the order of $[V_1]$ through $[V_3]$, the inflection output signal value H of the pixels $G_{11}$ through $G_{mn}$ are increased in the order of [IV] through [VI]. In FIGS. 5 and 6, $[a_1]$ through $[a_3]$, [b] through [d], [a], and $[d_1]$ through $[d_3]$ are constants. Of these, the inclinations $a_1$ through $a_3$ of input/output characteristics in the linear transformation operation under the driving condition of the exposure times $t_1$ through $t_3$ have a relation of proportionality with respect to these exposure times $t_1$ through $t_3$. The segments $d_1$ through $d_3$ of the input/output characteristics in the logarithmic transformation operation under the driving condition of control voltages $V_1$ through $V_3$ have a relation of proportionality with respect to the control voltages $V_1$ through $V_3$. In the following description, the reference exposure time is assumed as the exposure time $t_1$ when a predetermined amount th of incident light th is the minimum, i.e., when the percentage of the linear transformation operation being performed is the minimum, and the percentage of the logarithmic transformation operation being performed is the maximum.

Returning to FIG. 1, the imaging element 4 is connected with a black reference setting section 11 and a signal processing section 12 in that order through the amplifier 9 and analog-to-digital converter 10.

The conventionally known amplifier can be used as the amplifier 9, which is used to amplify the signal subjected to photoelectric conversion by the imaging element 4.

The electric signal amplified by the amplifier 9 is converted from the analog signal to the digital signal by the analog-to-digital converter 10.

The black reference setting section 11 is used to set the minimum level of the digital signal.

Figure 7:
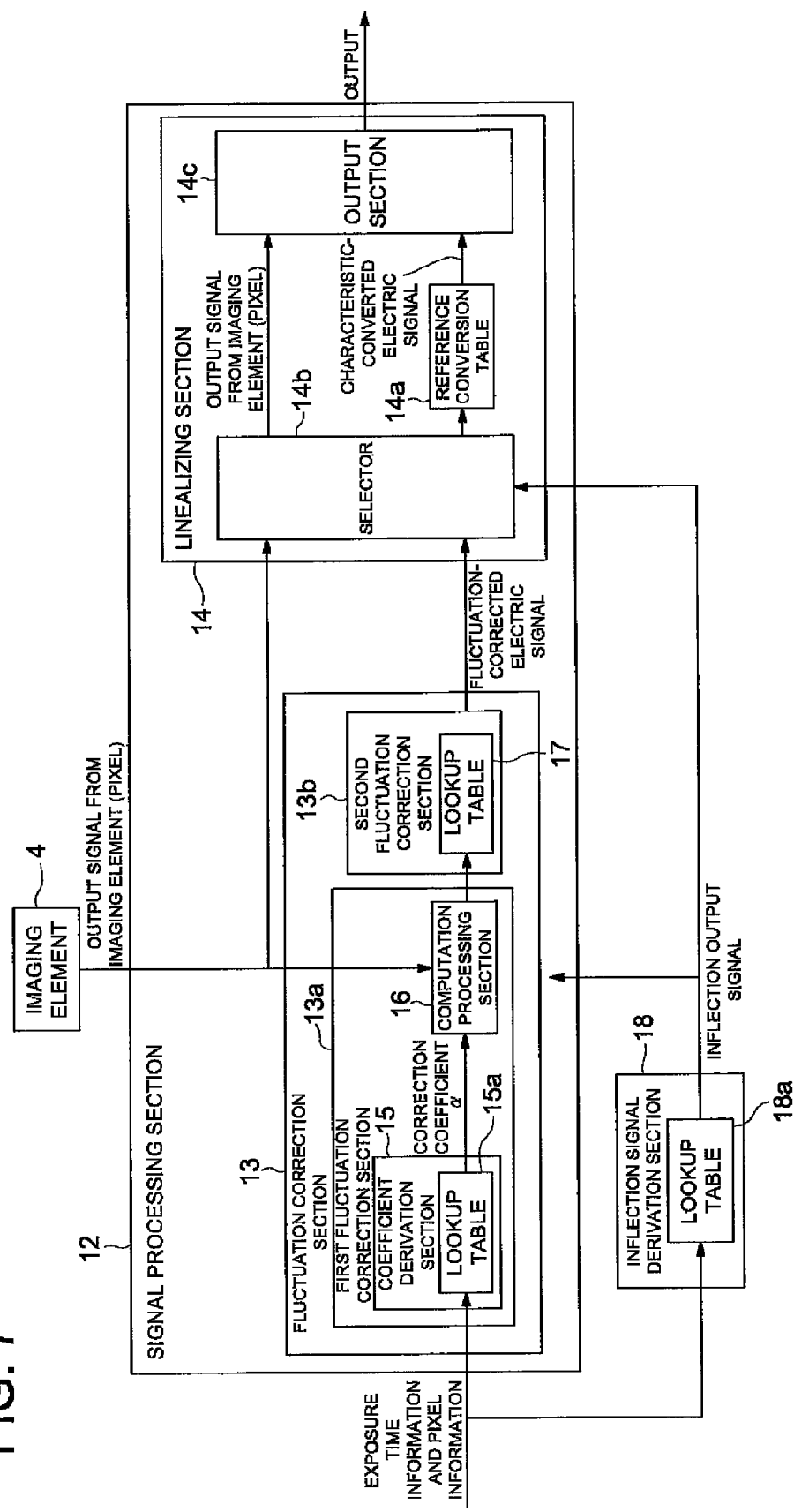
FIG. 7 is a block diagram showing the signal processing section and inflection signal derivation section.

The signal processing section 12 performs signal processing to the electric signal outputted from the imaging element 4 by logarithmic transformation operation. As shown in FIG. 7, the signal processing section 12 is provided with a fluctuation correction section 13 and a linearizing section 14.

When the input/output characteristics of the imaging element 4 is subjected to fluctuation caused by the driving condition of the imaging element 4—i.e., the exposure time of the pixels $G_{11}$ through $G_{mn}$ and the control voltage applied to the pixels $G_{11}$ through $G_{mn}$, the fluctuation correction section 13 corrects the fluctuation of the electric signal outputted from the imaging element 4. The fluctuation correction section 13 is provided with a first fluctuation correction section 13a and a second fluctuation correction section 13b.

As shown in FIG. 7, the first fluctuation correction section 13a is provided with a coefficient derivation section 15 and a computation processing section 16.

The coefficient derivation section 15 contained in the first fluctuation correction section 13a derives the correction coefficients $\alpha_{11}$ through $\alpha_{mn}$ for each of the pixels $G_{11}$ through $G_{mn}$, based on the exposure time information on the exposure time for the pixels $G_{11}$ through $G_{mn}$ and the pixel information on the pixels $G_{11}$ through $G_{mn}$. In the present embodiment, the coefficient derivation section 15 includes a lookup table 15a for calculating the correction coefficients $\alpha_{11}$ through $\alpha_{mn}$ by the input of the information on exposure time and pixel.

Figure 8:
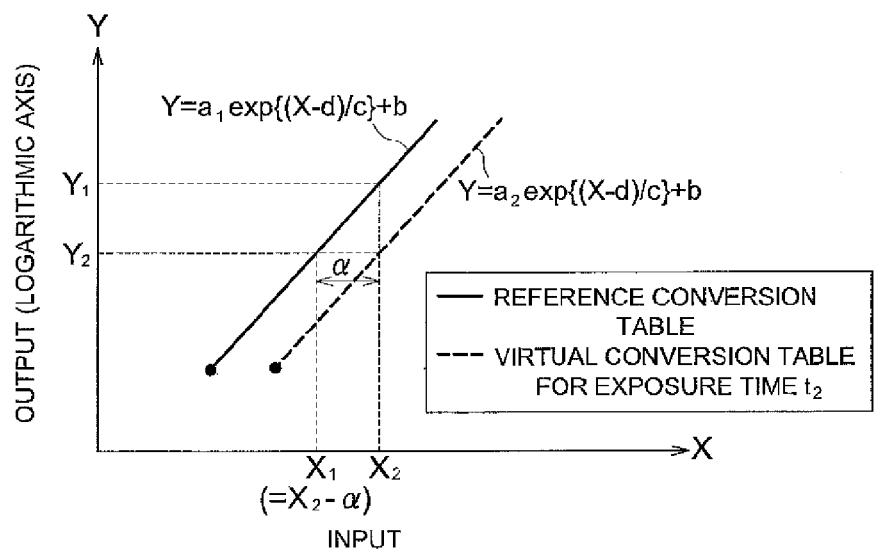
FIG. 8 is a diagram showing correction coefficient $\alpha$.
Figure 8:
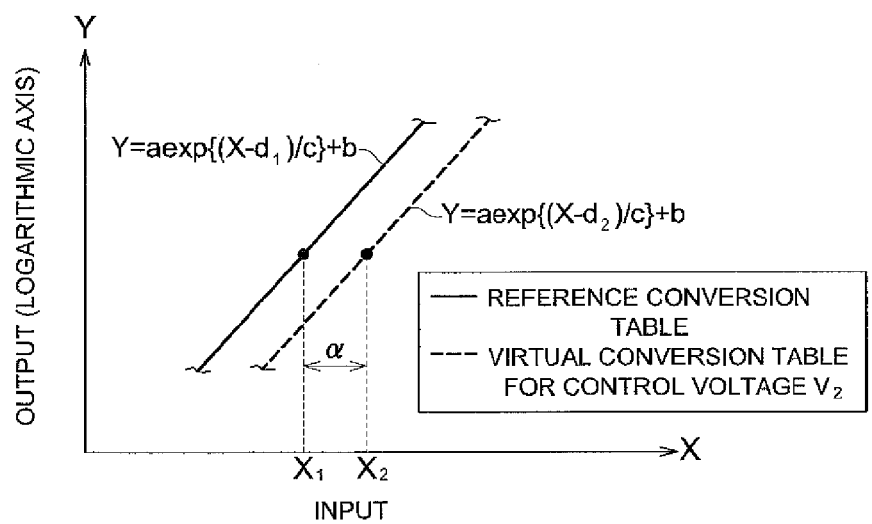

Here, for example, when the exposure time at the time of imaging is the exposure time $t_2$ (variable) (FIG. 5), the correction coefficient $\alpha$ is the value expressed by $\alpha = cLn(a_1/a_2) = cLn(t_1/t_2)$ To put it another way, as shown in FIG. 8 (a), the correction coefficient $\alpha$ is a distance on the input axis (X-axis in the drawing) between a virtual conversion table (dotted line in the drawing) having the conversion characteristic which ensures that the electric signal having been subjected to logarithmic transformation from the imaging element 4 under the driving condition of exposure time $t_2$ will be the electric signal having been subjected accurately to the linear transformation, and a reference conversion table 14a (solid line in the drawing). This virtual conversion table can be obtained by experiment or theoretical calculation. The virtual conversion table and reference conversion table 14a are parallel to each other. FIG. 8 (a) does not illustrate each conversion table in the linear area.

Inherent information such as the ID numbers of the pixels $G_{11}$ through $G_{mn}$ and information on position in the imaging element 4 are used as the information on pixel.

The computation processing section 16 contained in the first fluctuation correction section 13a corrects fluctuation for each of the pixels $G_{11}$ through $G_{mn}$ in conformity to the correction coefficients $\alpha_{11}$ through $\alpha_{mn}$ derived by the coefficient derivation section 15. In the present embodiment, the correction coefficients $\alpha_{11}$ through $\alpha_{mn}$ are subtracted from the electric signal outputted by each of pixels $G_{11}$ through $G_{mn}$ through the logarithmic transformation operation. Thus, the electric signal subjected to logarithmic transformation operation subsequent to fluctuation correction can undergo characteristic conversion into the electric signal which have been accurately subjected to linear transformation by the reference conversion table 14a.

Figure 15:
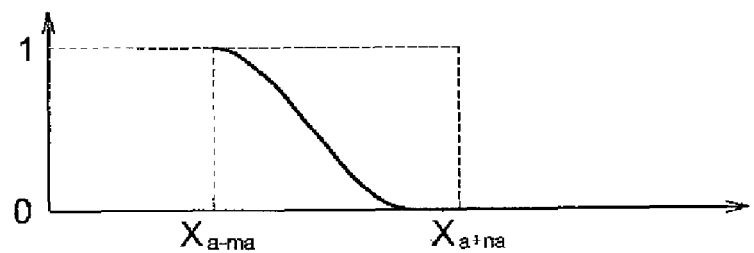
FIG. 15 is a chart showing the mixture ratio of the linear transformation and logarithmic transformation.
Figure 15:
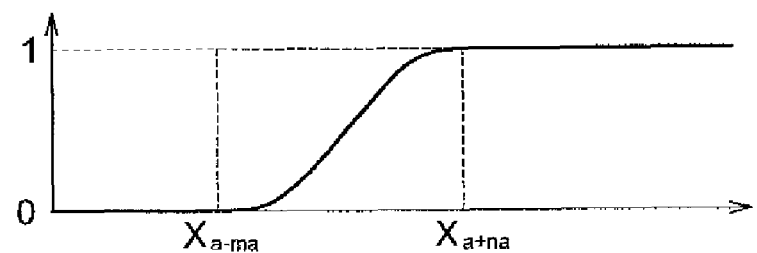

Concretely, as shown in FIG. 8 (a), for example, assume that $X_2$ is the signal value of the electric signal having been subjected to logarithmic transformation from the pixels $G_{11}$ through $G_{mn}$ under the driving condition of exposure time $t_2$ (FIG. 15). In this case, when the signal value $X_2$ having been subjected to logarithmic transformation undergoes characteristic conversion into the electric signal having been subjected accurately to linear transformation, i.e., when the signal value $X_2$ undergoes characteristic conversion by the virtual conversion table, the output signal value subsequent to characteristic conversion is $Y_2$. By contrast, the signal value $X_2$ is directly subjected to characteristic conversion according to the reference conversion table 14a, the signal value subsequent to characteristic conversion is $Y_1$. When the signal value $X_1 (=X_2-\alpha)$ obtained by subtracting the correction coefficient $\alpha$ from the signal value $X_2$ undergoes characteristic conversion according to the reference conversion table 14a, the signal value of the characteristic conversion is $Y_2$. To be more specific, when the correction coefficient $\alpha$ is subtracted from the signal value $X_2$ having been subjected to logarithmic transformation, the electric signal subsequent to subtraction can be subjected to characteristic conversion into the electric signal which has been subjected accurately to linear transformation according to the reference conversion table 14a.

The second fluctuation correction section 13b corrects the electric signals located near the switch point of the conversion characteristic of the imaging element 4 among the electric signals having been corrected to overlap the reference conversion table 14a, so as to overlap the actual characteristics of the imaging element 4 using the model formulas of two characteristics on both sides of the switch point. As shown in FIG. 7, the second fluctuation correction section 13b contains a lookup table 17. In the present embodiment, the electric signal in the vicinity of the inflection point is corrected using the model formulas of two characteristics on both sides of the inflection point (switch point).

To be more specific, the imaging element 4 of the present embodiment is a linear/log transformation sensor. The actual characteristic of the imaging element 4 exhibits a smooth curve near the inflection point. Accordingly, if the reference conversion table 14a of FIG. 8 (a) is kept unchanged, a correction error will occur with respect to the actual characteristics of the imaging element 4 near the inflection point. This will result in a conversion error.

Figure 9:
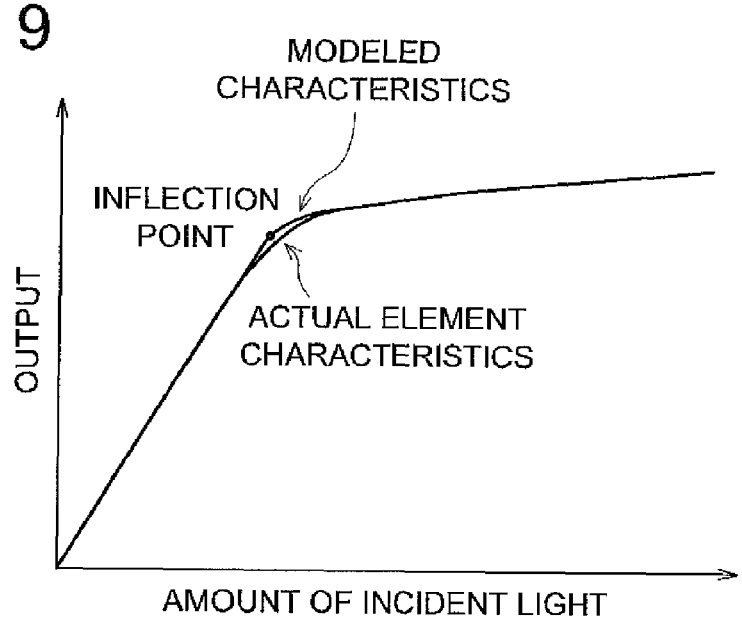
FIG. 9 is a chart showing the examples of the characteristics of an imaging element and output signal model.

FIG. 9 is a chart showing the output signal of the imaging element 4 with respect to the amount of incident light. In FIG. 9, the chart representing the output signal models given in terms of the mathematical expressions of the linear area and logarithmic area contains a correction error with respect to the actual characteristic of the imaging element 4 near the inflection point.

Figure 10:
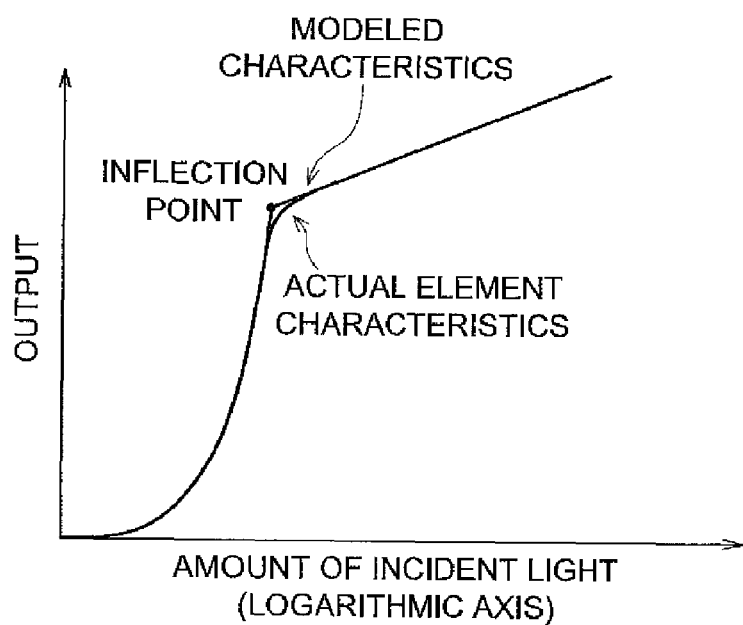
FIG. 10 is a chart showing the examples of the characteristics of an imaging element and output signal model.

FIG. 10 is a chart wherein the amount of incident light of FIG. 9 is plotted on the logarithmic axis. In the output signal model, the logarithmic area is linear and clearly shows a correction error with respect to the actual characteristics of the imaging element 4.

Figure 11:
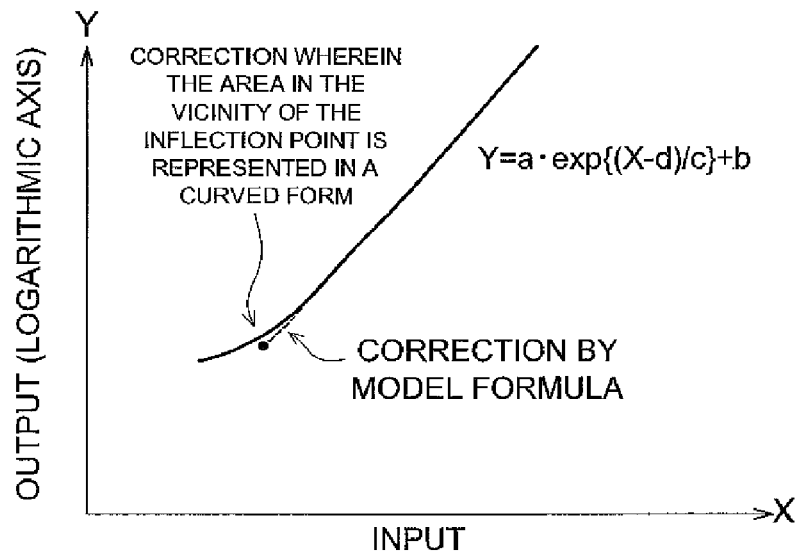
FIG. 11 is a chart showing the examples of the characteristics of an imaging element and output signal model.

In the meantime, FIG. 11 is a chart wherein the output of the imaging element 4 shown in FIG. 9 is plotted on the logarithmic axis. In the logarithmic area, linear output signal model exhibits a correction error with respect to the actual characteristics of the imaging element 4.

Figure 12:
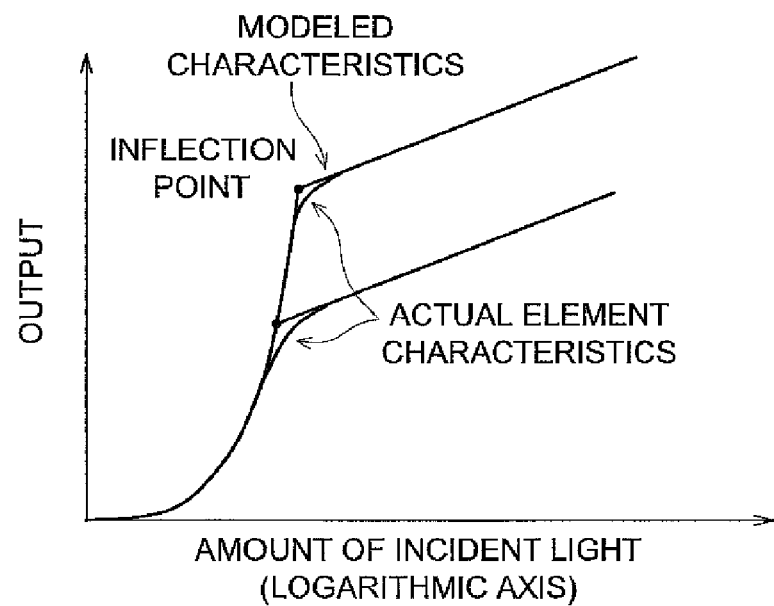
FIG. 12 is a chart showing the examples of the characteristics of an imaging element and output signal model.

FIG. 12 shows the output signal of the imaging element 4 with respect to the amount of incident light when there are a plurality of inflection points caused by the setting of the driving conditions of the imaging element 4, namely, the setting of the exposure time and control voltage. Similarly to the case of FIG. 10, the amount of the incident light is plotted on the logarithmic axis. In FIG. 12, a correction error occurs between the output signal model and the actual characteristic of the imaging element 4 in any one of a plurality of the areas in the vicinity of the inflection point. Further, the degree of correction error differs depending on inflection points.

Figure 13:
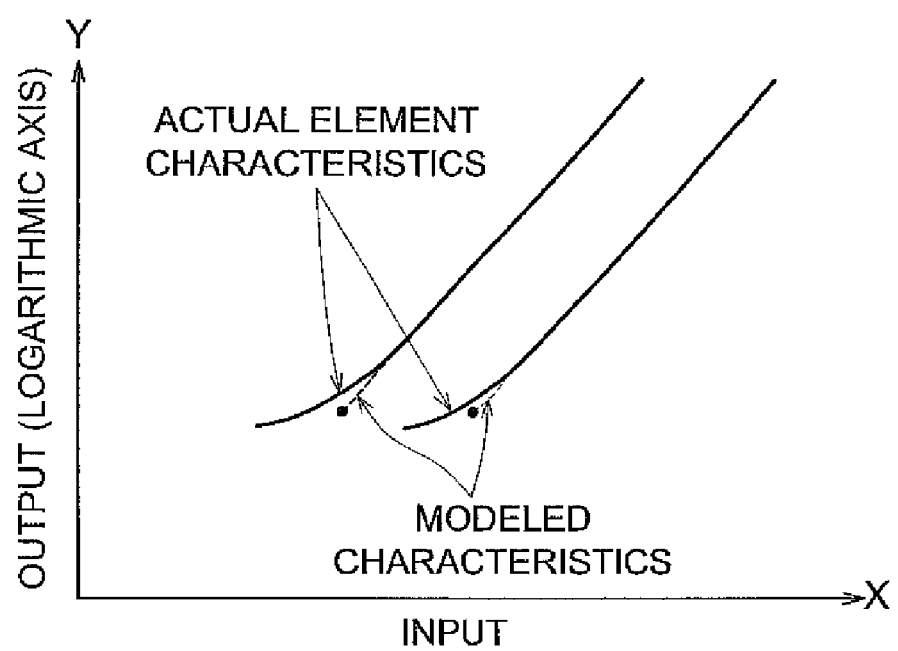
FIG. 13 is a chart showing the examples of the characteristics of an imaging element and output signal model.

FIG. 13 is a chart wherein the output of the imaging element 4 of FIG. 12 is plotted on the logarithm axis. As may be expected, a correction error occurs between the output signal model and the actual characteristic of the imaging element 4 in any one of a plurality of the areas in the vicinity of the inflection point. Further, the degree of a correction error differs depending on inflection points.

To solve such problems, the second fluctuation correction section 13b corrects the electrical signals located near the inflection point among the electrical signals outputted from the first fluctuation correction section 13a using the model formulas of the two characteristics on both sides of the inflection point, and suppresses a correction error with respect to the actual characteristics of the imaging element 4 using the lookup table 17.

In the second fluctuation correction section 13b, the values of the lookup table 17 is changed in response to the inflection point for each of the driving conditions of the imaging element 4 or a lookup table 17 is created for each inflection point, whereby the aforementioned correction is made in response to the inflection point for each of the driving conditions and the conversion error is suppressed.

The lookup table 17 derives the electric signal having been corrected using the model formulas of two characteristics on both sides of the inflection point, to ensure that the electric signal located near the inflection point will overlap the actual characteristics of the imaging element 4 by the input of the electric signal located near the inflection point among the electric signal outputted from the first fluctuation correction section 13a.

Figure 14:
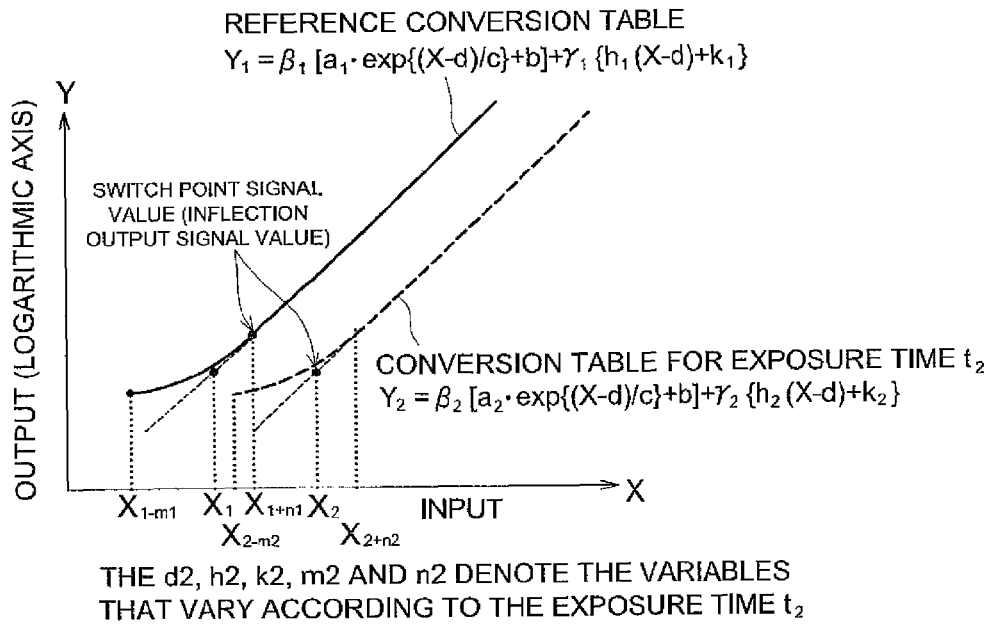
FIG. 14 is a chart showing the characteristics of the imaging element.
Figure 14:
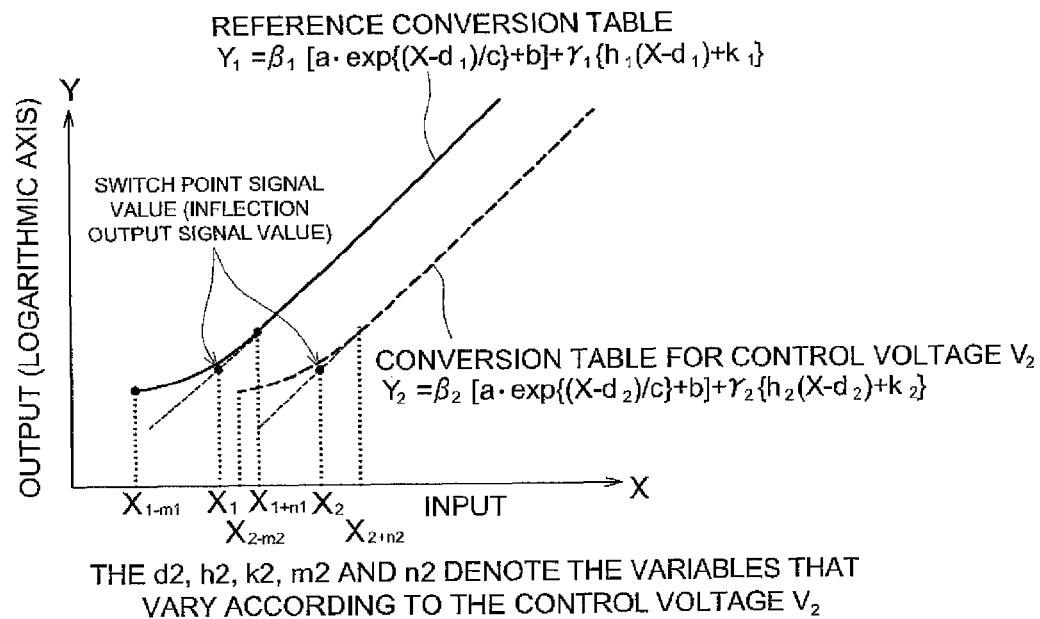

In this case, the second fluctuation correction section 13b determines the area in the vicinity of the inflection point based on the inflection output signal value inputted from the inflection signal derivation section 18 (FIG. 1), and allows the electric signal in the vicinity of the inflection point to be inputted into the lookup table 17. Here FIG. 14 (a) indicates the actual characteristics of the imaging element 4 corresponding to those of FIG. 8 (a). With respect to $X_1$ and $X_2$ of the inflection point, the range of the input signals $X=X_{1-m1}$ to $X_{1+n1}$, $X=X_{2-m2}$ to $X_{2+n2}$ is assumed as the area in the vicinity of the inflection point. In FIG. 14, the output of the imaging element 4 is plotted on the logarithmic axis, similarly to the case of FIG. 11. The second fluctuation correction section 13b of the present embodiment is provided with a lookup table (not illustrated) that allows the coefficients m and n of FIG. 14 to be derived by the input of the inflection output signal value. This lookup table is used to determine the area in the vicinity of the inflection point.

The parameter for correcting the electric signal near the inflection point using the model formulas of two characteristics on both sides of the inflection point can be obtained by experiment in advance so as to meet the characteristics of the imaging element 4. This will allow the lookup table 17 to be created.

For example, the characteristics of the linear/log transformation sensor as a imaging element 4 of the present embodiment can be expressed by the following mathematical formula (1) or (2). The following formula (1) shows the reference conversion table of FIG. 14 (a) and the following formula (2) shows the conversion table for exposure time $t_2$ of FIG. 14 (a).

[Mathematical Formula 1]

$$Y_1 = \beta_1[\alpha_1 \cdot \exp\{(X-d)/c\} + b] + \gamma_1\{h_1(X-d) + k_1\} \quad (1)$$

[Mathematical Formula 2]

$$Y_2 = \beta_2[\alpha_2 \cdot \exp\{(X-d)/c\} + b] + \gamma_2\{h_2(X-d) + k_2\} \quad (2)$$

In FIG. 14 (a), the vertical axis is a logarithmic axis. The coefficients $\beta_1$ and $\beta_2$ of the formulas (1) and (2) indicate the coefficients for the term in the linear area, and the coefficients $\gamma_1$ and $\gamma_2$ indicate the coefficients for the term in the logarithmic area.

FIG. 15 (a) shows an example of the change of coefficient $\beta_a$ near the inflection point, and FIG. 15 (b) indicates an example of the change of coefficient $\gamma_a$. As shown in FIG. 15 (a), the coefficient $\beta_a$ exhibits a gradual decrease near the inflection point, while the coefficient $\gamma_a$ exhibits a gradual increase, unlike the coefficient $\beta_a$, as shown in FIG. 15 (b). As described above, near the inflection point, the linear and logarithmic conversion characteristics are mixed with each other at a mixture ratio shown in FIGS. 15 (a) and (b), and the output signal of the imaging element 4 changes exhibiting a smooth curve.

As described above, the actual characteristics of the imaging element 4 can be expressed by a mathematical formula such as the aforementioned formula (1) or (2). The lookup table 17 can be created by conducting a test to obtain the parameter for correcting the electric signal located near the inflection point among the electric signal outputted from the first fluctuation correction section 13a based on the actual characteristics of the imaging element 4, using the model formulas of two characteristics on both sides of the inflection point.

The characteristics near the switch point (inflection point) of the imaging element 4 can be expressed by the aforementioned mathematical formula (1) or (2). Not only that, the characteristics of the imaging element 4 can be obtained by actual measurement.

Returning to FIG. 7, the linearizing section 14 is a characteristic conversion section that uses one conversion characteristic to uniformly convert the output signal of the imaging element 4 having a plurality of types of conversion characteristics. The linearizing section 14 of the present embodiment (uniformly) converts the output signal of the imaging element 4 having two conversion characteristics—linear transformation characteristic and logarithmic transformation characteristics—into the electric signal which is uniformly converted by one linear transformation characteristic. The linearizing section 14 can be replaced by signal processing section 12 equipped with a logarithmic transformation section that converts the electric signal into the electric signal uniformly converted by logarithmic transformation characteristic. As shown in FIG. 7, the linearizing section 14 is equipped with a selector 14b, reference conversion table 14a and output section 14c. In FIG. 7, the analog-to-digital converter 10 or controller 26 are not illustrated.

The selector 14b evaluates the relation of magnitude between the electric signal from the imaging element 4 and the aforementioned inflection output signal value H. If the electric signal from the imaging element 4 is greater than the inflection output signal value H, namely, if the logarithmically transformed electric signal is outputted from the imaging element 4, the output signal from the imaging element 4 is outputted to the reference conversion table 14*a*. If the electric signal from the imaging element 4 is equal to or smaller than the inflection output signal value H, the output signal is outputted to the output section 14*c*.

Figure 4:
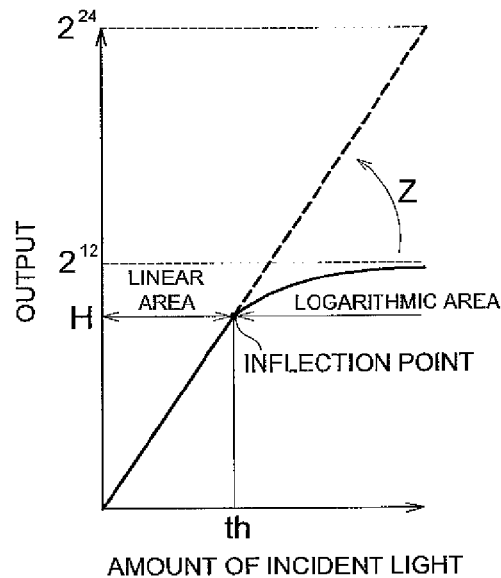
FIG. 4 is a diagram representing the operation of a pixel and a linearizing section.

As indicated by the arrow Z of FIG. 4, the reference conversion table 14*a* is used to characteristically convert the logarithmically transformed electric signal outputted from the imaging element 4, into the electric signal linearly transformed from the incident light. When the driving condition of the imaging element 4 is a predetermined reference condition—in the present embodiment, when the exposure time of the pixels $G_{11}$ through $G_{mn}$ is the aforementioned reference exposure time $t_1$—, the conversion characteristic of this reference conversion table 14*a* is set in such a way that the electric signal outputted by logarithmic transformation operation from the imaging element 4 is converted into the electric signal which is accurately linearly transformed.

The output section 14*c* outputs the electric signal inputted from the selector 14*b* or reference conversion table 14*a*.

Going back to FIG. 1, the signal processing section 12 is connected with an inflection signal derivation section 18 and an image processing section 19.

The inflection signal derivation section 18 derives the inflection output signal value H, based on the information on exposure time and pixel. As shown in FIG. 7, the present embodiment is provided with a lookup table 18*a* for deriving the inflection output signal value H by the input of information on exposure time and pixel.

The image processing section 19 applies image processing to the image data composed of all the electric signals from the pixels $G_{11}$ through $G_{mn}$, and is provided with an AWB (Auto white Balance) processing section 20, color interpolation section 21, color correction section 22, gradation conversion section 23, and color space conversion section 24. The AWB processing section 20, color interpolation section 21, color correction section 22, gradation conversion section 23, and color space conversion section 24 are connected to the signal processing section 12 in that order.

The AWB processing section 20 applies white balance processing to image data. Based on the electric signal coming from a plurality of proximity pixels provided with a filter of the same color, the color interpolation section 21 provides interpolation computation of the electric signal of this color for the pixel located between the proximity pixels. The color correction section 22 corrects the tone of color of the image data. To put it in greater details, the color correction section 22 corrects the electric signals of different colors for each of the pixels $G_{11}$ through $G_{mn}$, based on the electric signals of other colors. The gradation conversion section 23 provides gradation conversion of the image data, and the color space conversion section 24 converts the RGB signal into the YCbCr signal.

The signal processing section 12 is connected with an evaluation value calculation section 25 and controller 26 in that order.

The evaluation value calculation section 25 is employed to compute the AWB evaluation value used in the white balance processing (ABW processing) by the AWE processing section 20 and to compute the AE evaluation value used in the automatic exposure processing (AE processing) by the exposure control processing section 27.

The controller 26 controls each section of the imaging apparatus 1. As shown in FIG. 1, the controller 26 is connected with the amplifier 9, black reference setting section 11, signal processing section 12, inflection signal derivation section 18, AWB processing section 20, color interpolation section 21, color correction section 22, gradation conversion section 23, and color space conversion section 24.

The controller 26 is connected with the stop 3 through an exposure control processing section 27 and is connected with the imaging element 4 and analog-to-digital converter 10 through a signal generation section 28.

The exposure control processing section 27 is made up of a stop control mechanism and others, and controls the stop 3 using the control signal from the controller 26, in response to the feedback of the output signal and others of the evaluation value calculation section 25.

The signal generation section 28 controls the imaging operation of the imaging element 4. Based on the imaging control signal from the controller 26, the signal generation section 28 generates predetermined timing pulses (pixel drive signal, horizontal sync signal, vertical sync signal, horizontal scanning circuit drive signal, vertical scanning circuit drive signal, and others), which are outputted to the imaging element 4. Further, the signal generation section 28 also generates the timing signal for AD conversion.

Figure 16:
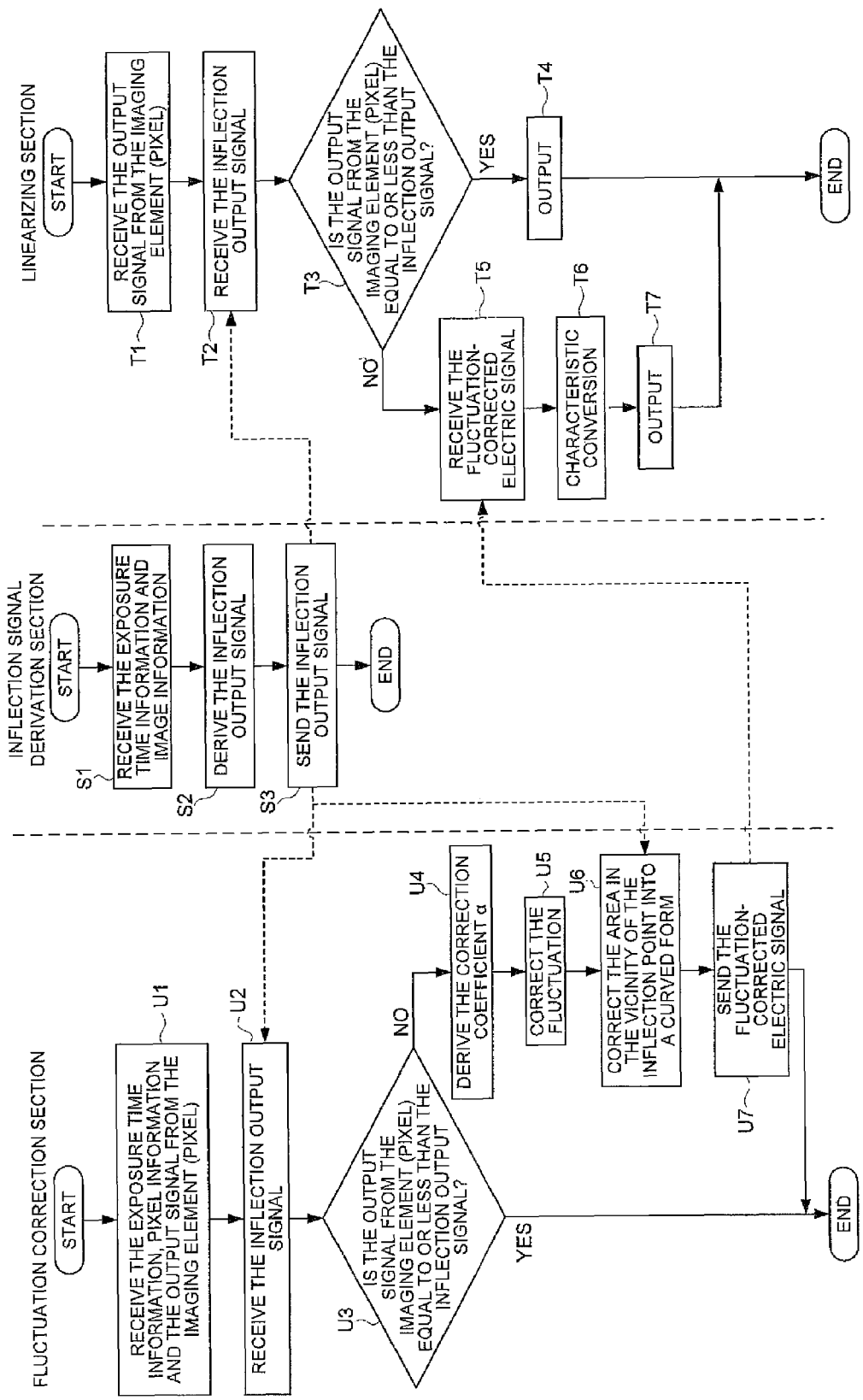
FIG. 16 is a flow chart representing the processing of fluctuation correction and characteristic conversion.

The following describes the imaging operation of the imaging apparatus 1 with reference to FIG. 16.

The imaging element 4 applies photoelectric conversion to the incident light to the pixels $G_{11}$ through $G_{mn}$, and outputs a linearly transformed or logarithmically transformed electric signal as an analog signal. Concretely, when the pixels $G_{11}$ through $G_{mn}$ have outputted electric signals to the signal readout line $L_D$, the constant current source D amplifies the electric signals, and the selection circuit 8 sample-holds them sequentially. When the sample-held electric signals have been sent to the correction circuit 8 from the selection circuit 8, the correction circuit 8 removes noise and outputs the electric signal.

The analog signal outputted from the imaging element 4 is amplified by the amplifier 9 and the analog-to-digital converter 10 coverts it into the digital signal. Then the black reference setting section 11 sets the digital signal to a minimum level. After that, as shown in FIG. 16, this digital signal is sent to the linearizing section 14 of the signal processing section 12 and fluctuation correction section 13 (Steps T1 and U1). Further, the controller 26 sends the exposure time information of the pixels $G_{11}$ through $G_{mn}$ of the imaging element 4, and pixel information to the fluctuation correction section 13 and inflection signal derivation section 18 (Steps U1 and S1).

After receiving the exposure time information and pixel information, the inflection signal derivation section 18 derives the inflection output signal value H according to the lookup table 18*a* (Step S2), and sends this signal value to the fluctuation correction section 13 and the selector 14*b* of the linearizing section 14. Thus because the lookup table 18*a* derives the inflection output signal value H based on the exposure time information and pixel information, accurate and quick derivation of the inflection output signal value H is achieved.

Upon receipt of the inflection output signal value H from the inflection signal derivation section 18 (Step U2), the fluctuation correction section 13 compares the magnitude between the signal value of the output signal from the pixels $G_{11}$ through $G_{mn}$ and the inflection output signal value H (the area in the vicinity of the inflection point, to put it in greater details) (Step U3). It the signal value of the output signal from the pixels $G_{11}$ through $G_{mn}$ does not exceed the inflection output signal value H (when smaller than the area in the vicinity of the inflection signal H (equivalent to "ma" in FIG. 15), to put it in greater details) r namely, if the output signal from the pixels $G_{11}$ through $G_{mn}$ is the linearly transformed electric signal (Yes in Step U3), the fluctuation correction section 13 terminates processing.

In the meantime, if the output signal from the pixels $G_{11}$ through $G_{mn}$ is greater than the inflection output signal value H (when greater than the area in the vicinity of the inflection output signal H (equivalent to "ma" in FIG. 15) to put it in greater details), namely, if the output signal from the pixels $G_{11}$ through $G_{mn}$ is not the linearly transformed electric signal (No in Step U3) in Step U3, the first fluctuation correction section 13a of the fluctuation correction section 13 derives the correction coefficients $\alpha_{11}$ through $\alpha_{mn}$ for each of the pixels $G_{11}$ through $G_{mn}$ according to the lookup table 15a (Step U4). Then fluctuation correction is performed by the computation processing section 16 for each of the pixels $G_{11}$ through $G_{mn}$ (Step U5). The second fluctuation correction section 13b corrects the fluctuation-corrected electric signal located near the inflection point using the model formulas of two characteristics on both sides of the inflection point so as to overlap the actual characteristics of the imaging element 4 (Step U6). Concretely, the electric signal near the inflection point is inputted into the lookup table 17, thereby deriving the electric signal located near the inflection point corrected by the model formulas of two characteristics on both sides of the inflection point. This is followed by the step of the fluctuation correction section 13 sending the fluctuation-corrected electric signal to the selector 14b of the linearizing section 14 (Step U7).

As described above, even when there is a fluctuation in the input/output characteristics of the pixels $G_{11}$ through $G_{mn}$ caused by the exposure time of the pixels $G_{11}$ through $G_{mn}$, the disagreement between the output value in the reference exposure time $t_1$ and the actual output value of the pixels $G_{11}$ through $G_{mn}$ is corrected by the fluctuation correction of the first fluctuation correction section 13a. Further, the coefficient derivation section 15 derives the correction coefficients $\alpha_{11}$ through $\alpha_{mn}$ based on the exposure time at the time of imaging and the pixel information. This arrangement ensures the fluctuation in the input/output characteristics of the imaging element 4 to be corrected accurately by the computation processing section 16 using the correction coefficients $\alpha_{11}$ through $\alpha_{mn}$. This arrangement also allows accurate and quick derivation of coefficients $\alpha_{11}$ through $\alpha_{mn}$ to be achieved by the lookup table 15a. Fluctuation correction is carried out only when the output signal from the pixels $G_{11}$ through $G_{mn}$ is the logarithmically transformed electric signal. This eliminates the need of wasting the fluctuation correction and ensures high-speed signal processing. The second fluctuation correction section 13b prevents a correction error from occurring between the fluctuation-corrected electric signal and actual characteristics of the imaging element 4 near the inflection point.

When the linearizing section 14 has received the inflection output signal value H from the inflection signal derivation section 18 (Step T2), the selector 14b of the linearizing section 14 compares the magnitude between the signal value of the output signal from the pixels $G_{11}$ through $G_{mn}$ and the inflection output signal value H (Step T3). When the output signal from the pixels $G_{11}$ through $G_{mn}$ does not exceed the inflection output signal value H (Yes in Step T3), the output signal from the pixels $G_1$ through $G_{mn}$ is directly outputted through the output section 14c (Step T4). In the meantime, when the output signal from the pixels $G_{11}$ through $G_{mn}$ is greater than the inflection output signal value H (No in Step T3), the selector 14b receives a fluctuation-corrected electric signal from the fluctuation correction section 13 (Step T5), and allows this electric signal to undergo characteristics conversion according to the reference conversion table 14a (Step T6). Then the electric signal is outputted through the output section 14c (Step T7).

As described above, the linearizing section 14 converts characteristics only when the output signal from the pixels $G_{11}$ through $G_{mn}$ is the logarithmically transformed electric signal. This eliminates the need of wasting the time for unwanted characteristic conversion and ensures high-speed signal processing.

Based on the electric signal outputted from the linearizing section 14, the evaluation value calculation section 25 calculates the AWB evaluation value and AE evaluation value.

Based on the AE evaluation value having been calculated, the controller 26 controls the exposure control processing section 27 and adjusts the amount of exposure for the imaging element 4.

According to the AWB evaluation value and the minimum level set on the black reference setting section 11, the controller 26 controls the AWB processing section 20, and performs white balance processing to the image data outputted from the signal processing section 12.

According to the image data outputted from the AWB processing section 20, image processing is carried out by the color interpolation section 21, color correction section 22, gradation conversion section 23 and color space conversion section 24. After that, the image data is outputted.

As described above, in the imaging apparatus 1 of the present embodiment, if there is a fluctuation in the input/output characteristics of the imaging element 4 caused by at least one of the driving conditions of the imaging element 4, the fluctuation of the electric signal outputted from the imaging element 4 is corrected. Even if the input/output characteristics are fluctuated by the driving conditions, the disagreement between the output value in the reference driving conditions and the actual output value of the imaging element 4 is corrected, unlike the conventional method. This uniformly ensures accurate linear transformation of the electric signal by the characteristic conversion.

The first fluctuation correction section 13a provides simple and quick fluctuation correction based on the modeled mathematical formula. When the fluctuation is corrected in conformity to the mathematical formula modeling the output signal of each characteristic using the first fluctuation correction section 13a, the actual output signal of the imaging element 4 exhibits a smoothly curved change near the inflection point. This produces a correction error with respect to the output signal model. However, the conversion error can be suppressed and image quality can be improved by correcting the output signal near the inflection point using the model formulas of two characteristics on both sides of the inflection point.

Further, the coefficient derivation section 15 derives the correction coefficients based on the driving conditions. If the derived correction coefficient is employed by the computation processing section 16, it is possible to accurately correct the fluctuation of the input/output characteristics of the imaging element 4 caused by the driving conditions.

The coefficient derivation section 15 derives the correction coefficient based on the driving conditions and pixel information. Thus, if the derived correction coefficient is utilized by the computation processing section 16, it is possible to accurately correct the fluctuation in the input/output characteristics of the imaging element 4 caused by the driving conditions or pixel.

The correction coefficient is derived in conformity to the lookup table 15a. Thus, the structure of the coefficient derivation section 15 can be simplified and the derivation speed can be increased, as compared to the case of deriving the correction coefficient by computation.

The fluctuation correction section 13 derives the fluctuation-corrected electric signal in conformity to the driving conditions. This ensures accurate correction of the fluctuation in the input/output characteristics of the imaging element 4 caused by driving conditions. Further, the fluctuation-corrected electric signal is derived in conformity to the lookup table. Thus, the structure of the fluctuation correction section 13 can be simplified and the derivation speed can be increased, as compared to the case of deriving the fluctuation-corrected electric signal by computation.

The fluctuation-corrected electric signal is derived based on the driving conditions and pixel information. This arrangement accurately corrects the fluctuation in the input/output characteristics of the imaging element 4 caused by the driving conditions or pixel.

The switch point of a plurality of types of conversion characteristics fluctuates in response to the driving conditions of the imaging element 4. When the output signal of the area in the vicinity of the inflection point is corrected in response to this switch point, the conversion error can be reduced more effectively.

Further, the corrected output signal is derived by the lookup table 17. This arrangement simplifies the structure of the second fluctuation correction section 13b and increases the derivation speed, as compared to the correction by computation.

Since the fluctuation correction section 13 is provided in the form associated with each pixel, accurate fluctuation correction can be made even if there is a difference in the amount of fluctuation of the input/output characteristics for each pixel.

Since the linearizing section 14 is provided in the form associated with each pixel, all the electric signals are linearly transformed uniformly in an accurate manner even if there is a difference in photoelectric conversion characteristics for each pixel.

The signal processing section 12 performs signal processing only when the output signal of the imaging element 4 is the electric signal having been converted by any one of a plurality of types of conversion characteristics. Signal processing such as characteristic conversion or fluctuation correction is not performed if there is no need of conversion using other conversion characteristic. This eliminates the need of wasting the time for unwanted signal processing work, and ensures high-speed signal processing.

The inflection output signal value is derived according to the driving conditions, and this ensures accurate derivation of the inflection output signal value.

Further, the inflection output signal value is derived in conformity to the driving conditions and pixel information. This method ensures accurate derivation of the inflection output signal value.

The inflection output signal value is derived by the lookup table 18a. This arrangement simplifies the structure of the inflection signal derivation section and increases the derivation speed, as compared to the case of derivation by computation.

Variations of Embodiments

The following describes the variations of the aforementioned embodiments. The similar components as those of the aforementioned embodiments will be assigned with the same numerals of reference, and will not be described to avoid duplication.

When there is a fluctuation in the input/output characteristics of the pixels $G_{11}$ through $G_{mn}$ caused by the control voltage of the pixels $G_{11}$ through $G_{mn}$, the first fluctuation correction section 13a of the fluctuation correction section 13 in this variation corrects the fluctuation of the electric signal outputted from the pixels $G_{11}$ through $G_{mn}$.

Concretely, the coefficient derivation section 15 of the first fluctuation correction section 13a is used under the following conditions: The reference control voltage is assumed as the control voltage $V_1$ when a predetermined amount of the incident light th is the minimum, as shown in FIGS. 6 and 8 (b), and the correction coefficient $\alpha$ is assumed as the distance $X_2-X_1=d_1-d_2=m_1V_1-m_2V_2$ (where $m_2=d_2/V_2$, $m_1=d_1/V_1$) on the input axis (x-axis in FIG. 8 (b)) between the virtual conversion table corresponding to the driving conditions of the control voltage $V_1$ (variable) and the reference conversion table 14a corresponding to the driving conditions of the reference control voltage $V_1$.

Similarly to the case of the aforementioned embodiments, the second fluctuation correction section 13b of the present variation corrects the electric signals outputted from the first fluctuation correction section 13a and located near the inflection point, in conformity to the lookup table 17 using the model formulas of two characteristics on both sides of the inflection point. In the present embodiment as well, the actual characteristics of the imaging element 4 can be expressed by the following formula (3) or (4). The lookup table 17 can be created in advance by obtaining the parameters required for correction through experiment based on these formulas. The following formula (3) represents the output signal $Y_1$ in conformity to the reference conversion table in FIG. 14 (b). The following formula (4) represents the output signal $Y_2$ in conformity to the conversion table in FIG. 14 (b).

[Mathematical Formula 3]

$$Y_1=\beta_1[\alpha\cdot\exp\{(X-d_1)/c\}+b]+\gamma_1\{h_1(X-d_1)+k_1\} \quad (3)$$

[Mathematical Formula 4]

$$Y_2=\beta_2[\alpha\cdot\exp\{(X-d_2)/c\}+b]+\gamma_2\{h_2(X-d_2)+k_2\} \quad (4)$$

In such cases, the same advantages as those in the aforementioned embodiments can be obtained.

In the description of the aforementioned embodiments and variation, the fluctuation correction section 13 is arranged on the pre-stage of the linearizing section 14, but can be arranged on the post-stage. Further, the coefficient derivation section 15 can be arranged on the pre-stage of the linearizing section 14 and the computation processing section 16 can be installed on the post-stage.

And, the exposure time and control voltage are used as the driving conditions of the imaging element 4, but temperature can be utilized.

The first fluctuation correction section 13a of the fluctuation correction section 13 has been described as being equipped with a computation processing section 16 for deriving the fluctuation-corrected electric signal. The first fluctuation correction section 13a can be equipped with a lookup table for deriving the fluctuation-corrected electric signal by the input of the driving condition driving conditions, pixel information and the electric signal which is outputted from the imaging element 4. In this case, the same advantages as those of the aforementioned embodiments can be obtained. Not only that, the structure of the fluctuation correction section 13 can be simplified, as compared to the case of deriving the fluctuation-corrected electric signal by computation.

In the aforementioned description, one fluctuation correction section 13 and one linearizing section 14 are provided. However, a plurality of fluctuation correction sections 13 and linearizing sections 14 can be installed in the form associated with the pixels $G_{11}$ through $G_{mn}$, respectively. Particularly when a plurality of the linearizing sections 14 are provided, all the electric signals are linearly transformed uniformly in an accurate manner even if there is a difference in photoelectric conversion characteristics for each of the pixels $G_{11}$ through $G_{mn}$. Further, when a plurality of fluctuation correction sections 13 are provided, accurate fluctuation correction is ensured even if there is a difference in the amount of fluctuation of the input/output characteristics for each of the pixels $G_{11}$ through $G_{mn}$.

The coefficient derivation section 15 has been described as deriving the correction coefficients $\alpha_{11}$ through for each of pixels $G_{11}$ through $G_{mn}$ based on the driving condition driving conditions and pixel information. The coefficient derivation section 15 can be designed as deriving the correction coefficient $\alpha$ common to the pixels $G_{11}$ through $G_{mn}$, based on the driving condition driving conditions alone.

Further, the coefficient derivation section 15 has been described as containing a reference conversion table 14a for deriving the correction coefficient. The coefficient derivation section 15 can be designed as including a computing unit for deriving the correction coefficient by the input of the driving condition driving conditions or the like.

The characteristic conversion section of the present invention has been described as a linearizing section 14 which performs characteristic conversion for converting the logarithmically converted electric signal into the linearly transformed electric signal. However, the characteristic conversion section can be a linearizing section 14 which performs characteristic conversion for converting the linearly transformed electric signal into the logarithmically converted electric signal.

The inflection signal derivation section 18 has been described as deriving the inflection output signal value H, based on the driving condition driving conditions and pixel information. However, the inflection signal derivation section 18 can derive the inflection output signal value H, based on the driving condition driving conditions alone. The inflection signal derivation section 18 is described as including a lookup table 18a for deriving the inflection output signal value H. It can be equipped with a computing unit for deriving the inflection output signal value H. Further, the linearizing section 14 has described as performing characteristic conversion in conformity to the reference conversion table 14a. However, computation such as conversion of an exponent can be used to perform characteristic conversion.

The pixels $G_{11}$ through $G_{mn}$ have been described as having the structure of FIG. 3. However, the structure disclosed in the aforementioned Patent Document 1 can be used if switching is possible between the linear transformation operation and logarithmic conversion operation.

The invention claimed is:

1. An imaging apparatus comprising:
an imaging element having a plurality of pixels for converting incident light into electric signal using a plurality of types of conversion characteristics; and
a signal processing section for processing an output signal of the imaging element, the signal processing section comprising:
a fluctuation correction section that, when input/output characteristics of the imaging element are subjected to fluctuation caused by at least one of driving conditions of the imaging element, corrects the fluctuation of the output signal of the imaging element; and
a characteristic conversion section for uniformly converting the output signal of the imaging element using one conversion characteristic,
wherein the fluctuation correction section comprises:
a first correction section for correcting the fluctuation according to a computation formula obtained by modeling the plurality of types of conversion characteristics; and
a second correction section correcting the output signals located near the switch points of a plurality of types of the conversion characteristics among the output signals whose fluctuation has been corrected by the first correction section,
wherein the second correction section corrects the output signals so as to overlap the characteristics of the imaging elements, by using a model formulas of two characteristics on both sides of a switch point.

2. The imaging apparatus of claim 1,
wherein the first correction section comprises:
a coefficient derivation section for deriving a correction coefficient; and
a computation processing section for correcting the fluctuation based on the correction coefficient.

3. The imaging apparatus of claim 2,
wherein the coefficient derivation section derives the correction coefficient based on the driving conditions.

4. The imaging apparatus of claim 2,
wherein the coefficient derivation section derives the correction coefficient for each pixel based on the driving conditions and pixel information on the pixel, and the computation processing section corrects the fluctuation for each pixel.

5. The imaging apparatus of claim 2,
wherein the coefficient derivation section comprises a lookup table for deriving the correction coefficient by the input of at least the driving conditions.

6. The imaging apparatus of claim 2,
wherein the coefficient derivation section comprises a computing unit for deriving the correction coefficient by the input of at least the driving conditions.

7. The imaging apparatus of claim 1,
wherein the first correction section comprises the lookup table for deriving the fluctuation-corrected electric signal by the input of the driving conditions and the output signal of the imaging element.

8. The imaging apparatus of claim 7,
wherein the lookup table derives the fluctuation corrected electric signal through the input of the driving conditions, pixel information on the pixel, and the output signal of the imaging element.

9. The imaging apparatus of claim 1,
wherein the second correction section corrects the output signal near the switch point in response to the switch point of a plurality of types of conversion characteristics for each of the driving conditions.

10. The imaging apparatus of claim 1,
wherein the second correction section comprises a lookup table for deriving the corrected output signal using the model formulas of two characteristics on both sides of the switch point so as to overlap the characteristics of the imaging element by the input of the output signal near the switch point.

11. The imaging apparatus of claim 1,
further comprises a plurality of the fluctuation correction sections associated with pixels.

12. The imaging apparatus of claim 1, further comprises a derivation section for deriving the switch point signal value at the switch point for the plurality of types of conversion characteristics wherein the signal processing section provides signal processing according to the relation of magnitude between the output signal value from the imaging element and the signal value of the switch point signal, only when the output signal from the imaging element is the electric signal converted by any one of a plurality of types of conversion characteristics.

13. The imaging apparatus of the claim 12, wherein the derivation section further derives the switch point signal value, based on the driving conditions.

14. The imaging apparatus of the claim 13, wherein the derivation section further comprises a lookup table for deriving the switch point signal value.

15. The imaging apparatus described in claim 13, further comprises a computing unit for deriving the switch point signal value.

16. The imaging apparatus of claim 12, wherein the derivation section further derives the switch point signal value, based on the driving conditions and the information on pixel.

17. The imaging apparatus described in claim 1, wherein the driving condition further is at least one of a temperature at the time of imaging, an exposure time of the pixel and a control voltage for the pixel.

18. The imaging apparatus of claim 1, wherein further a plurality of pixels are formed in such a way that the linear transformation characteristic for linearly transforming the electric signal and the logarithmic transformation characteristic for logarithmically transforming the incident light can be switched in response to the amount of incident light.

* * * * *